Figure 1:
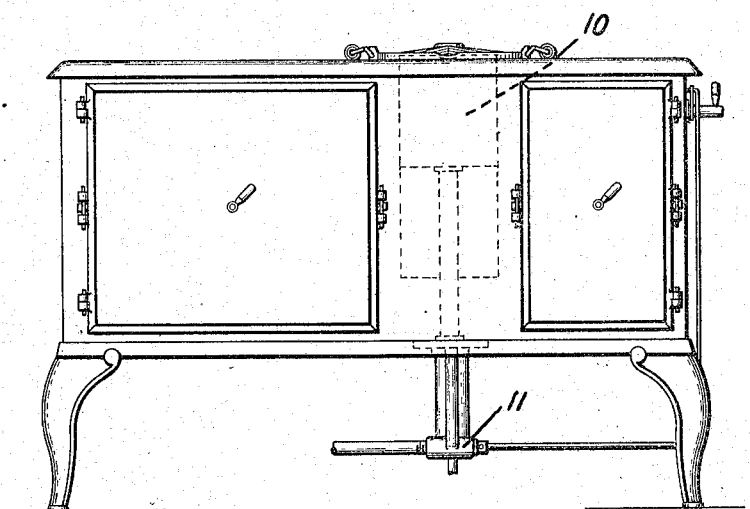

W. STANLEY & H. P. BALL.
ELECTRIC BROILER.
APPLICATION FILED NOV. 4, 1912.

1,122,041.

Patented Dec. 22, 1914.

Witnesses:
Carl G. Klock
J. Ellis Glen

Inventors:
William Stanley,
Henry Price Ball,
by
Their Attorney

UNITED STATES PATENT OFFICE.

WILLIAM STANLEY, OF GREAT BARRINGTON, AND HENRY PRICE BALL, OF PITTSFIELD, MASSACHUSETTS, ASSIGNORS TO GENERAL ELECTRIC COMPANY, A CORPORATION OF NEW YORK.

ELECTRIC BROILER.

1,122,041.  Specification of Letters Patent.  Patented Dec. 22, 1914.

Application filed November 4, 1912. Serial No. 729,206.

*To all whom it may concern:*

Be it known that we, WILLIAM STANLEY, a citizen of the United States, residing at Great Barrington, county of Berkshire, State of Massachusetts, and HENRY PRICE BALL, a citizen of the United States, residing at Pittsfield, county of Berkshire, State of Massachusetts, have invented certain new and useful Improvements in Electric Broilers, of which the following is a specification.

Our invention relates to cooking utensils and more particularly to cooking utensils adapted to be used in connection with storage ranges of the general character disclosed in Stanley Patent No. 1,025,843.

The object of our invention is to produce a utensil which is suitable for the carrying out of cooking operations which require a comparatively high temperature and to which heat may be readily transferred from the heat storage mass constituting part of the ranges heretofore referred to.

In carrying out our invention we provide a utensil of a shape suitable for the carrying out of a particular operation or operations which require comparatively high temperatures and having the bottom surface thereof of such shape that it will contact intimately with that portion of the storage mass or thermal switch which extends or may be extended to or above the outer casing of the range. We provide the aforesaid utensil with an independent electric heating means so that the heat furnished by the storage mass may be supplemented when desired.

In the drawing accompanying the present application, we have shown our invention embodied in a broiler. Our invention will be more clearly understood by referring to the said drawing in which—

Figure 2:
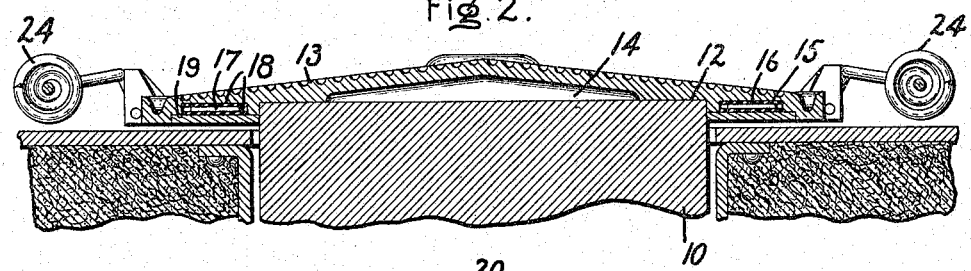
Figure 3:
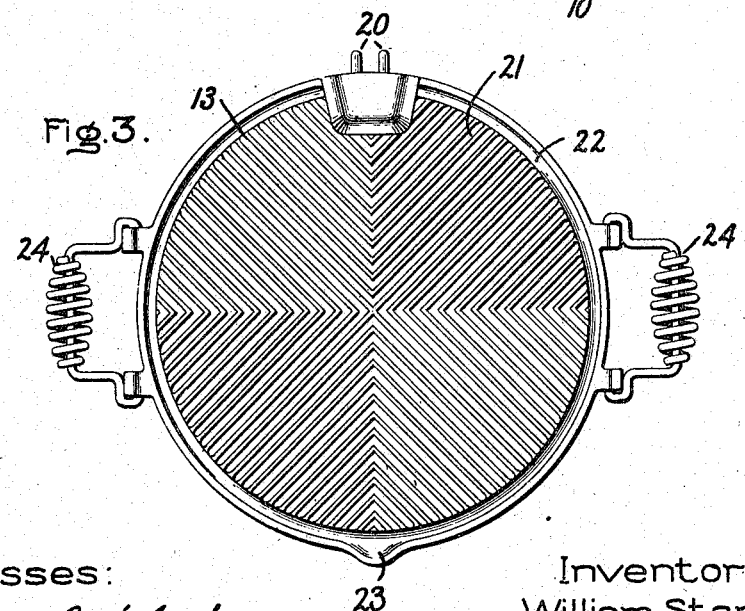

Figure 1 is an elevation of a range in connection with which our invention may be used; Fig. 2 is a vertical section through the broiler and a portion of the storage range; Fig. 3 is a plan view of the broiler.

The range shown in Fig. 1 is similar to that disclosed in Stanley Patent No. 1,025,843. The plunger 10 constituting a portion of the heat storage mass is shown in its elevated position. As disclosed in the aforesaid patent this plunger is adapted to be raised and lowered by any suitable means such as the hydraulic means 11 shown in the drawing. When in its lowermost position the plunger 10 is in the most intimate contact with the remaining portion of the storage mass (not shown). When in its uppermost position it still preserves contact with the rest of the storage mass, and as shown in the drawing enters the recess 12 formed in the lower surface of the broiler plate 13. The broiler plate 13 is composed of metal such as cast iron. The top surface is preferably conical and in addition to the recess 12 a conical recess 14 may be formed in the bottom surface thereof so as to reduce the weight of the plate and consequently the mass to be heated and still have sufficient surface for contact with the plunger. In the bottom of the broiler plate and around the periphery thereof may be formed an annular recess 15 and the electrical resistance heating unit 16 inserted therein. This unit as shown is of a well known type and comprises the resistance element 17 and insulating sheets 18 separating the same from the metal of the broiler plate. A removable cover plate 19 is provided, which when in position is flush with the bottom surface at the periphery of the broiler plate. Terminals 20 are provided for the resistance wire and for the attachment of a plug carrying sockets connected to a source of electric current. The upper surface of the plate 14 is preferably provided with grooves or channels 21 extending from the middle portion thereof to a peripheral channel or trough 22 having a spout 23. The plate is preferably provided with handles 24 which may be pivotally attached to the same.

In practice, the plate 13 may be placed over the aperture in the top of the range corresponding to the plunger 10 of the storage mass. By elevating the plunger thereof so that the upper portion enters the recess 12 and contacts with the broiler plate, heat may be transferred from the storage mass to the broiler. The storage mass will ordinarily be hot enough to provide a sufficiently high temperature for the broiling operation, but if this should not be the case more heat can be secured by means of the heat resistance unit 16. The location of this unit is such that it will heat the peripheral portion of the plate which will be the coolest owing to its location with reference to the plunger. The steak or other article which is to be broiled may be placed over the broiler plate so that the juice which escapes therefrom during the broiling operation may flow by means of the channels formed in the surface of the plate to the peripheral channel 22 where it will collect and may be poured by means of the spout 24. When the broiling operation is completed the plunger may be lowered and the broiler removed from over the aperture after which a heat insulating cover may be inserted therein.

It is obvious that the above described device may be used independently of the storage range by simply supplying sufficient energy to the electrical resistance heating unit 16.

Various changes and modifications will suggest themselves to those skilled in the art and are to be considered as coming within the scope of our invention as it is set forth in the following claims.

What we claim as new and desire to secure by Letters Patent of the United States, is:—

1. A cooking utensil comprising a heating body having its top exposed, a metal plate, the bottom of which is a counterpart of the top of the heating body, so as to secure good thermal conductive relation between the two, and an electric resistance heating unit mounted in good thermal conductive relation with said plate.

2. A cooking utensil comprising a heating body having its top exposed, a metal plate, the middle portion of the bottom of which is a counterpart of the top of the heating body, so as to have good conductive relation therewith, and an electric resistance heating unit mounted in good thermal conductive relation with said plate and surrounding said middle portion.

3. A cooking utensil comprising a heating body having its top exposed, a middle plate having its bottom recessed to receive the top of the heating body, so as to form a good conductive relation therewith, and an electric resistance heating unit in good thermal conductive relation with said plate and surrounding said recess.

4. A broiler comprising a metal plate having the middle portion of its upper surface higher than the peripheral portion thereof and an electric resistance heating unit in good thermal conductive relation with said plate and located at said peripheral portion.

5. A broiler consisting of a plate having the middle portion higher than the peripheral portion thereof, an electrical heating unit located in said peripheral portion, said plate being channeled around its periphery.

6. In a heating device, a heat storage mass having an exposed surface, a metal plate having its bottom surface shaped to secure intimate contact with the exposed surface of said storage mass, and an electric resistance heating unit mounted in good thermal conductive relation with said plate.

In witness whereof, I, WILLIAM STANLEY, have hereunto set my hand this 10th day of October 1912, and I, HENRY PRICE BALL, have hereunto set my hand this 16th day of October 1912.

WILLIAM STANLEY.
HENRY PRICE BALL.

Witnesses for Stanley:
  F. G. LARAMEE,
  W. W. STANLEY.
Witnesses for Ball:
  H. B. DAVERIN,
  J. G. EDDY.